United States Patent
Ng et al.

(10) Patent No.: US 8,896,957 B1
(45) Date of Patent: Nov. 25, 2014

(54) DISK DRIVE PERFORMING SPIRAL SCAN OF DISK SURFACE TO DETECT RESIDUAL DATA

(71) Applicant: Western Digital Technologies, Inc., Irvine, CA (US)

(72) Inventors: Yap Han Ng, Kepong (MY); Charles A. Park, Aromas, CA (US); Songwut Jomthaisong, Buriram (TH); Siri S. Weerasooriya, Campbell, CA (US); Brian P. Rigney, Louisville, CO (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/922,935

(22) Filed: Jun. 20, 2013

Related U.S. Application Data

(60) Provisional application No. 61/822,232, filed on May 10, 2013.

(51) Int. Cl.
   *G11B 5/03* (2006.01)
   *G11B 21/02* (2006.01)
   *G11B 27/36* (2006.01)
   *G11B 5/024* (2006.01)

(52) U.S. Cl.
   CPC .................................. *G11B 5/024* (2013.01)
   USPC ................................. 360/66; 360/75; 360/31

(58) Field of Classification Search
   None
   See application file for complete search history.

(56) References Cited

U.S. PATENT DOCUMENTS

| | | | |
|---|---|---|---|
| 5,668,679 A | 9/1997 | Swearingen et al. | |
| 5,754,352 A | 5/1998 | Behrens et al. | |
| 6,005,727 A | 12/1999 | Behrens et al. | |
| 6,014,283 A | 1/2000 | Codilian et al. | |
| 6,021,012 A | 2/2000 | Bang | |
| 6,040,955 A * | 3/2000 | Brown et al. | 360/75 |
| 6,052,076 A | 4/2000 | Patton, III et al. | |
| 6,052,250 A | 4/2000 | Golowka et al. | |
| 6,067,206 A | 5/2000 | Hull et al. | |
| 6,078,453 A | 6/2000 | Dziallo et al. | |
| 6,091,564 A | 7/2000 | Codilian et al. | |
| 6,094,020 A | 7/2000 | Goretzki et al. | |
| 6,101,065 A | 8/2000 | Alfred et al. | |
| 6,104,153 A | 8/2000 | Codilian et al. | |
| 6,122,133 A | 9/2000 | Nazarian et al. | |
| 6,122,135 A | 9/2000 | Stich | |
| 6,141,175 A | 10/2000 | Nazarian et al. | |
| 6,160,368 A | 12/2000 | Plutowski | |
| 6,181,502 B1 | 1/2001 | Hussein et al. | |
| 6,191,906 B1 | 2/2001 | Buch | |
| 6,195,222 B1 | 2/2001 | Heminger et al. | |
| 6,198,584 B1 | 3/2001 | Codilian et al. | |
| 6,198,590 B1 | 3/2001 | Codilian et al. | |
| 6,204,988 B1 | 3/2001 | Codilian et al. | |
| 6,243,223 B1 | 6/2001 | Elliott et al. | |
| 6,281,652 B1 | 8/2001 | Ryan et al. | |
| 6,285,521 B1 | 9/2001 | Hussein | |

(Continued)

*Primary Examiner* — Andrew L Sniezek

(57) ABSTRACT

A disk drive is disclosed comprising a disk surface comprising a radius, a head operable to generate a read signal, and a voice coil motor (VCM) operable to actuate the head over the disk surface. A back electromotive force (BEMF) voltage generated by the VCM is measured. The VCM is controlled to move the head over substantially the entire radius of the disk surface in response to the BEMF voltage, and while moving the head the read signal from the head is processed to detect residual data recorded on the disk surface after erasing the disk surface.

22 Claims, 5 Drawing Sheets

(56) References Cited

U.S. PATENT DOCUMENTS

| | | |
|---|---|---|
| 6,292,318 B1 | 9/2001 | Hayashi |
| 6,292,320 B1 | 9/2001 | Mason et al. |
| 6,304,407 B1 | 10/2001 | Baker et al. |
| 6,310,742 B1 | 10/2001 | Nazarian et al. |
| 6,320,718 B1 | 11/2001 | Bouwkamp et al. |
| 6,342,984 B1 | 1/2002 | Hussein et al. |
| 6,347,018 B1 | 2/2002 | Kadlec et al. |
| 6,369,972 B1 | 4/2002 | Codilian et al. |
| 6,369,974 B1 | 4/2002 | Asgari et al. |
| 6,411,453 B1 | 6/2002 | Chainer et al. |
| 6,462,896 B1 | 10/2002 | Codilian et al. |
| 6,476,996 B1 | 11/2002 | Ryan |
| 6,484,577 B1 | 11/2002 | Bennett |
| 6,493,169 B1 | 12/2002 | Ferris et al. |
| 6,496,324 B1 | 12/2002 | Golowka et al. |
| 6,498,698 B1 | 12/2002 | Golowka et al. |
| 6,507,450 B1 | 1/2003 | Elliott |
| 6,519,107 B1 | 2/2003 | Ehrlich et al. |
| 6,534,936 B2 | 3/2003 | Messenger et al. |
| 6,538,839 B1 | 3/2003 | Ryan |
| 6,545,835 B1 | 4/2003 | Codilian et al. |
| 6,549,359 B1 | 4/2003 | Bennett et al. |
| 6,549,361 B1 | 4/2003 | Bennett et al. |
| 6,560,056 B1 | 5/2003 | Ryan |
| 6,568,268 B1 | 5/2003 | Bennett |
| 6,574,062 B1 | 6/2003 | Bennett et al. |
| 6,577,465 B1 | 6/2003 | Bennett et al. |
| 6,587,293 B1 | 7/2003 | Ding et al. |
| 6,614,615 B1 | 9/2003 | Ju et al. |
| 6,614,618 B1 | 9/2003 | Sheh et al. |
| 6,636,377 B1 | 10/2003 | Yu et al. |
| 6,690,536 B1 | 2/2004 | Ryan |
| 6,693,764 B1 | 2/2004 | Sheh et al. |
| 6,704,156 B1 | 3/2004 | Baker et al. |
| 6,707,635 B1 | 3/2004 | Codilian et al. |
| 6,710,953 B1 | 3/2004 | Vallis et al. |
| 6,710,966 B1 | 3/2004 | Codilian et al. |
| 6,714,371 B1 | 3/2004 | Codilian |
| 6,714,372 B1 | 3/2004 | Codilian et al. |
| 6,724,564 B1 | 4/2004 | Codilian et al. |
| 6,731,450 B1 | 5/2004 | Codilian et al. |
| 6,735,041 B1 | 5/2004 | Codilian et al. |
| 6,738,205 B1 | 5/2004 | Moran et al. |
| 6,738,220 B1 | 5/2004 | Codilian |
| 6,747,837 B1 | 6/2004 | Bennett |
| 6,760,186 B1 | 7/2004 | Codilian et al. |
| 6,788,483 B1 | 9/2004 | Ferris et al. |
| 6,791,785 B1 | 9/2004 | Messenger et al. |
| 6,795,268 B1 | 9/2004 | Ryan |
| 6,819,518 B1 | 11/2004 | Melkote et al. |
| 6,826,006 B1 | 11/2004 | Melkote et al. |
| 6,826,007 B1 | 11/2004 | Patton, III |
| 6,847,502 B1 | 1/2005 | Codilian |
| 6,850,383 B1 | 2/2005 | Bennett |
| 6,850,384 B1 | 2/2005 | Bennett |
| 6,867,944 B1 | 3/2005 | Ryan |
| 6,876,508 B1 | 4/2005 | Patton, III et al. |
| 6,882,496 B1 | 4/2005 | Codilian et al. |
| 6,885,514 B1 | 4/2005 | Codilian et al. |
| 6,900,958 B1 | 5/2005 | Yi et al. |
| 6,900,959 B1 | 5/2005 | Gardner et al. |
| 6,903,897 B1 | 6/2005 | Wang et al. |
| 6,914,740 B1 | 7/2005 | Tu et al. |
| 6,914,743 B1 | 7/2005 | Narayana et al. |
| 6,920,004 B1 | 7/2005 | Codilian et al. |
| 6,924,959 B1 | 8/2005 | Melkote et al. |
| 6,924,960 B1 | 8/2005 | Melkote et al. |
| 6,924,961 B2 | 8/2005 | Melkote et al. |
| 6,934,114 B1 | 8/2005 | Codilian et al. |
| 6,934,135 B1 | 8/2005 | Ryan |
| 6,937,420 B1 | 8/2005 | McNab et al. |
| 6,937,423 B1 | 8/2005 | Ngo et al. |
| 6,943,978 B1 | 9/2005 | Lee |
| 6,952,322 B1 | 10/2005 | Codilian et al. |
| 6,954,324 B1 | 10/2005 | Tu et al. |
| 6,958,881 B1 | 10/2005 | Codilian et al. |
| 6,963,465 B1 | 11/2005 | Melkote et al. |
| 6,965,488 B1 | 11/2005 | Bennett |
| 6,967,458 B1 | 11/2005 | Bennett et al. |
| 6,967,799 B1 | 11/2005 | Lee |
| 6,967,811 B1 | 11/2005 | Codilian et al. |
| 6,970,319 B1 | 11/2005 | Bennett et al. |
| 6,972,539 B1 | 12/2005 | Codilian et al. |
| 6,972,540 B1 | 12/2005 | Wang et al. |
| 6,972,922 B1 | 12/2005 | Subrahmanyam et al. |
| 6,975,480 B1 | 12/2005 | Codilian et al. |
| 6,977,789 B1 | 12/2005 | Cloke |
| 6,980,389 B1 | 12/2005 | Kupferman |
| 6,985,316 B1 | 1/2006 | Liikanen et al. |
| 6,987,636 B1 | 1/2006 | Chue et al. |
| 6,987,639 B1 | 1/2006 | Yu |
| 6,989,954 B1 | 1/2006 | Lee et al. |
| 6,992,848 B1 | 1/2006 | Agarwal et al. |
| 6,992,851 B1 | 1/2006 | Cloke |
| 6,992,852 B1 | 1/2006 | Ying et al. |
| 6,995,941 B1 | 2/2006 | Miyamura et al. |
| 6,999,263 B1 | 2/2006 | Melkote et al. |
| 6,999,267 B1 | 2/2006 | Melkote et al. |
| 7,002,761 B1 | 2/2006 | Sutardja et al. |
| 7,006,320 B1 | 2/2006 | Bennett et al. |
| 7,016,134 B1 | 3/2006 | Agarwal et al. |
| 7,019,937 B1 | 3/2006 | Liikanen et al. |
| 7,023,637 B1 | 4/2006 | Kupferman |
| 7,023,640 B1 | 4/2006 | Codilian et al. |
| 7,027,256 B1 | 4/2006 | Subrahmanyam et al. |
| 7,027,257 B1 | 4/2006 | Kupferman |
| 7,035,026 B2 | 4/2006 | Codilian et al. |
| 7,046,472 B1 | 5/2006 | Melkote et al. |
| 7,050,249 B1 | 5/2006 | Chue et al. |
| 7,050,254 B1 | 5/2006 | Yu et al. |
| 7,050,258 B1 | 5/2006 | Codilian |
| 7,054,098 B1 | 5/2006 | Yu et al. |
| 7,061,714 B1 | 6/2006 | Yu |
| 7,064,918 B1 | 6/2006 | Codilian et al. |
| 7,068,451 B1 | 6/2006 | Wang et al. |
| 7,068,459 B1 | 6/2006 | Cloke et al. |
| 7,068,461 B1 | 6/2006 | Chue et al. |
| 7,068,463 B1 | 6/2006 | Ji et al. |
| 7,088,533 B1 | 8/2006 | Shepherd et al. |
| 7,088,547 B1 | 8/2006 | Wang et al. |
| 7,095,579 B1 | 8/2006 | Ryan et al. |
| 7,110,208 B1 | 9/2006 | Miyamura et al. |
| 7,110,214 B1 | 9/2006 | Tu et al. |
| 7,113,362 B1 | 9/2006 | Lee et al. |
| 7,113,365 B1 | 9/2006 | Ryan et al. |
| 7,116,505 B1 | 10/2006 | Kupferman |
| 7,126,781 B1 | 10/2006 | Bennett |
| 7,136,253 B1 | 11/2006 | Liikanen et al. |
| 7,145,744 B1 | 12/2006 | Clawson et al. |
| 7,158,329 B1 | 1/2007 | Ryan |
| 7,180,703 B1 | 2/2007 | Subrahmanyam et al. |
| 7,184,230 B1 | 2/2007 | Chue et al. |
| 7,196,864 B1 | 3/2007 | Yi et al. |
| 7,199,966 B1 | 4/2007 | Tu et al. |
| 7,203,021 B1 | 4/2007 | Ryan et al. |
| 7,209,321 B1 | 4/2007 | Bennett |
| 7,212,364 B1 | 5/2007 | Lee |
| 7,212,374 B1 | 5/2007 | Wang et al |
| 7,215,504 B1 | 5/2007 | Bennett |
| 7,215,617 B2 | 5/2007 | Ando et al. |
| 7,224,546 B1 | 5/2007 | Orakcilar et al. |
| 7,230,786 B1 | 6/2007 | Ray et al. |
| 7,248,426 B1 | 7/2007 | Weerasooriya et al. |
| 7,251,098 B1 | 7/2007 | Wang et al. |
| 7,253,582 B1 | 8/2007 | Ding et al. |
| 7,253,989 B1 | 8/2007 | Lau et al. |
| 7,256,956 B2 | 8/2007 | Ehrlich |
| 7,265,933 B1 | 9/2007 | Phan et al. |
| 7,289,288 B1 | 10/2007 | Tu |
| 7,298,574 B1 | 11/2007 | Melkote et al. |
| 7,301,717 B1 | 11/2007 | Lee et al. |
| 7,304,819 B1 | 12/2007 | Melkote et al. |
| 7,330,019 B1 | 2/2008 | Bennett |
| 7,330,327 B1 | 2/2008 | Chue et al. |

(56) References Cited

U.S. PATENT DOCUMENTS

| | | |
|---|---|---|
| 7,333,280 B1 | 2/2008 | Lifchits et al. |
| 7,333,286 B2 | 2/2008 | Jung et al. |
| 7,333,290 B1 | 2/2008 | Kupferman |
| 7,339,761 B1 | 3/2008 | Tu et al. |
| 7,365,932 B1 | 4/2008 | Bennett |
| 7,382,564 B1 | 6/2008 | Everett et al. |
| 7,388,728 B1 | 6/2008 | Chen et al. |
| 7,391,583 B1 | 6/2008 | Sheh et al. |
| 7,391,584 B1 | 6/2008 | Sheh et al. |
| 7,405,897 B2 | 7/2008 | Dougherty et al. |
| 7,411,758 B1 | 8/2008 | Cheung et al. |
| 7,414,809 B2 | 8/2008 | Smith et al. |
| 7,433,143 B1 | 10/2008 | Ying et al. |
| 7,440,210 B1 | 10/2008 | Lee |
| 7,440,225 B1 | 10/2008 | Chen et al. |
| 7,450,334 B1 | 11/2008 | Wang et al. |
| 7,450,336 B1 | 11/2008 | Wang et al. |
| 7,453,661 B1 | 11/2008 | Jang et al. |
| 7,457,071 B1 | 11/2008 | Sheh |
| 7,466,509 B1 | 12/2008 | Chen et al. |
| 7,468,855 B1 | 12/2008 | Weerasooriya et al. |
| 7,477,471 B1 | 1/2009 | Nemshick et al. |
| 7,480,116 B1 | 1/2009 | Bennett |
| 7,489,464 B1 | 2/2009 | McNab et al. |
| 7,492,546 B1 | 2/2009 | Miyamura |
| 7,495,857 B1 | 2/2009 | Bennett |
| 7,499,236 B1 | 3/2009 | Lee et al. |
| 7,502,192 B1 | 3/2009 | Wang et al. |
| 7,502,195 B1 | 3/2009 | Wu et al. |
| 7,502,197 B1 | 3/2009 | Chue |
| 7,505,223 B1 | 3/2009 | McCornack |
| 7,522,370 B1 | 4/2009 | Sutardja |
| 7,529,055 B1 | 5/2009 | Laks et al. |
| 7,542,225 B1 | 6/2009 | Ding et al. |
| 7,548,392 B1 | 6/2009 | Desai et al. |
| 7,551,387 B2 | 6/2009 | Sun et al. |
| 7,551,390 B1 | 6/2009 | Wang et al. |
| 7,558,016 B1 | 7/2009 | Le et al. |
| 7,561,361 B1 | 7/2009 | Rutherford |
| 7,573,670 B1 | 8/2009 | Ryan et al. |
| 7,576,941 B1 | 8/2009 | Chen et al. |
| 7,580,212 B1 | 8/2009 | Li et al. |
| 7,583,470 B1 | 9/2009 | Chen et al. |
| 7,595,954 B1 | 9/2009 | Chen et al. |
| 7,602,575 B1 | 10/2009 | Lifchits et al. |
| 7,616,399 B1 | 11/2009 | Chen et al. |
| 7,619,844 B1 | 11/2009 | Bennett |
| 7,619,846 B2 | 11/2009 | Shepherd et al. |
| 7,623,313 B1 | 11/2009 | Liikanen et al. |
| 7,626,782 B1 | 12/2009 | Yu et al. |
| 7,630,162 B2 | 12/2009 | Zhao et al. |
| 7,639,445 B2 | 12/2009 | Matsunaga et al. |
| 7,639,446 B2 | 12/2009 | Mizukoshi et al. |
| 7,639,447 B1 | 12/2009 | Yu et al. |
| 7,656,604 B1 | 2/2010 | Liang et al. |
| 7,656,607 B1 | 2/2010 | Bennett |
| 7,660,067 B1 | 2/2010 | Ji et al. |
| 7,663,835 B1 | 2/2010 | Yu et al. |
| 7,675,705 B2 | 3/2010 | Mizukoshi et al. |
| 7,675,707 B1 | 3/2010 | Liu et al. |
| 7,679,854 B1 | 3/2010 | Narayana et al. |
| 7,688,534 B1 | 3/2010 | McCornack |
| 7,688,538 B1 | 3/2010 | Chen et al. |
| 7,688,539 B1 | 3/2010 | Bryant et al. |
| 7,697,233 B1 | 4/2010 | Bennett et al. |
| 7,701,661 B1 | 4/2010 | Bennett |
| 7,710,676 B1 | 5/2010 | Chue |
| 7,715,138 B1 | 5/2010 | Kupferman |
| 7,715,143 B2 | 5/2010 | Bliss et al. |
| 7,728,539 B2 | 6/2010 | Smith et al. |
| 7,729,079 B1 | 6/2010 | Huber |
| 7,733,189 B1 | 6/2010 | Bennett |
| 7,733,588 B1 | 6/2010 | Ying |
| 7,737,793 B1 | 6/2010 | Ying et al. |
| 7,746,592 B1 | 6/2010 | Liang et al. |
| 7,746,594 B1 | 6/2010 | Guo et al. |
| 7,746,595 B1 | 6/2010 | Guo et al. |
| 7,751,144 B1 | 7/2010 | Sutardja |
| 7,760,461 B1 | 7/2010 | Bennett |
| 7,787,211 B2 | 8/2010 | Kim et al. |
| 7,800,853 B1 | 9/2010 | Guo et al. |
| 7,800,856 B1 | 9/2010 | Bennett et al. |
| 7,800,857 B1 | 9/2010 | Calaway et al. |
| 7,839,591 B1 | 11/2010 | Weerasooriya et al. |
| 7,839,595 B1 | 11/2010 | Chue et al. |
| 7,839,600 B1 | 11/2010 | Babinski et al. |
| 7,843,662 B1 | 11/2010 | Weerasooriya et al. |
| 7,852,588 B1 | 12/2010 | Ferris et al. |
| 7,852,592 B1 | 12/2010 | Liang et al. |
| 7,852,598 B1 | 12/2010 | Sutardja |
| 7,864,481 B1 | 1/2011 | Kon et al. |
| 7,864,482 B1 | 1/2011 | Babinski et al. |
| 7,869,155 B1 | 1/2011 | Wong |
| 7,876,522 B1 | 1/2011 | Calaway et al. |
| 7,876,523 B1 | 1/2011 | Panyavoravaj et al. |
| 7,881,004 B2 | 2/2011 | Kumbla et al. |
| 7,881,005 B1 | 2/2011 | Cheung et al. |
| 7,916,415 B1 | 3/2011 | Chue |
| 7,916,416 B1 | 3/2011 | Guo et al. |
| 7,916,420 B1 | 3/2011 | McFadyen et al. |
| 7,916,422 B1 | 3/2011 | Guo et al. |
| 7,929,238 B1 | 4/2011 | Vasquez |
| 7,961,422 B1 | 6/2011 | Chen et al. |
| 7,969,675 B2 | 6/2011 | Duan et al. |
| 8,000,053 B1 | 8/2011 | Anderson |
| 8,031,423 B1 | 10/2011 | Tsai et al. |
| 8,054,022 B1 | 11/2011 | Ryan et al. |
| 8,059,357 B1 | 11/2011 | Knigge et al. |
| 8,059,360 B1 | 11/2011 | Melkote et al. |
| 8,072,703 B1 | 12/2011 | Calaway et al. |
| 8,077,428 B1 | 12/2011 | Chen et al. |
| 8,078,901 B1 | 12/2011 | Meyer et al. |
| 8,081,395 B1 | 12/2011 | Ferris |
| 8,085,020 B1 | 12/2011 | Bennett |
| 8,116,023 B1 | 2/2012 | Kupferman |
| 8,145,934 B1 | 3/2012 | Ferris et al. |
| 8,179,626 B1 | 5/2012 | Ryan et al. |
| 8,189,286 B1 | 5/2012 | Chen et al. |
| 8,213,106 B1 | 7/2012 | Guo et al. |
| 8,254,222 B1 | 8/2012 | Tang |
| 8,300,348 B1 | 10/2012 | Liu et al. |
| 8,315,005 B1 | 11/2012 | Zou et al. |
| 8,320,069 B1 | 11/2012 | Knigge et al. |
| 8,351,174 B1 | 1/2013 | Gardner et al. |
| 8,358,114 B1 | 1/2013 | Ferris et al. |
| 8,358,145 B1 | 1/2013 | Ferris et al. |
| 8,390,367 B1 | 3/2013 | Bennett |
| 8,432,031 B1 | 4/2013 | Agness et al. |
| 8,432,629 B1 | 4/2013 | Rigney et al. |
| 8,451,697 B1 | 5/2013 | Rigney et al. |
| 8,482,873 B1 | 7/2013 | Chue et al. |
| 8,498,076 B1 | 7/2013 | Sheh et al. |
| 8,498,172 B1 | 7/2013 | Patton, III et al. |
| 8,508,881 B1 | 8/2013 | Babinski et al. |
| 8,531,798 B1 | 9/2013 | Xi et al. |
| 8,537,486 B2 | 9/2013 | Liang et al. |
| 8,542,455 B2 | 9/2013 | Huang et al. |
| 8,553,351 B1 | 10/2013 | Narayana et al. |
| 8,564,899 B2 | 10/2013 | Lou et al. |
| 8,576,506 B1 | 11/2013 | Wang et al. |
| 8,605,382 B1 | 12/2013 | Mallary et al. |
| 8,605,384 B1 | 12/2013 | Liu et al. |
| 8,610,391 B1 | 12/2013 | Yang et al. |
| 8,611,040 B1 | 12/2013 | Xi et al. |
| 8,619,385 B1 | 12/2013 | Guo et al. |
| 8,630,054 B2 | 1/2014 | Bennett et al. |
| 8,630,059 B1 | 1/2014 | Chen et al. |
| 8,634,154 B1 | 1/2014 | Rigney et al. |
| 8,634,283 B1 | 1/2014 | Rigney et al. |
| 8,643,976 B1 | 2/2014 | Wang et al. |
| 8,649,121 B1 | 2/2014 | Smith et al. |
| 8,654,466 B1 | 2/2014 | McFadyen |
| 8,654,467 B1 | 2/2014 | Wong et al. |
| 8,665,546 B1 | 3/2014 | Zhao et al. |

(56) References Cited

U.S. PATENT DOCUMENTS

| | | |
|---|---|---|
| 8,665,551 B1 | 3/2014 | Rigney et al. |
| 8,670,206 B1 | 3/2014 | Liang et al. |
| 8,687,312 B1 | 4/2014 | Liang |
| 8,693,123 B1 | 4/2014 | Guo et al. |
| 8,693,134 B1 | 4/2014 | Xi et al. |
| 8,699,173 B1 | 4/2014 | Kang et al. |
| 8,711,027 B1 | 4/2014 | Bennett |
| 8,717,696 B1 | 5/2014 | Ryan et al. |
| 8,717,699 B1 | 5/2014 | Ferris |
| 8,717,704 B1 | 5/2014 | Yu et al. |
| 8,724,245 B1 | 5/2014 | Smith et al. |
| 8,724,253 B1 | 5/2014 | Liang et al. |
| 8,724,524 B2 | 5/2014 | Urabe et al. |
| 8,737,008 B1 | 5/2014 | Watanabe et al. |
| 8,737,013 B2 | 5/2014 | Zhou et al. |
| 8,743,495 B1 | 6/2014 | Chen et al. |
| 8,743,503 B1 | 6/2014 | Tang et al. |
| 8,743,504 B1 | 6/2014 | Bryant et al. |
| 8,749,904 B1 | 6/2014 | Liang et al. |
| 2006/0171059 A1 | 8/2006 | Chan et al. |
| 2007/0070538 A1 | 3/2007 | Lau et al. |
| 2007/0076314 A1 | 4/2007 | Rigney |
| 2007/0211367 A1 | 9/2007 | Lau et al. |
| 2007/0291401 A1 | 12/2007 | Sun et al. |
| 2009/0086357 A1 | 4/2009 | Ehrlich |
| 2010/0035085 A1 | 2/2010 | Jung et al. |
| 2012/0284493 A1 | 11/2012 | Lou et al. |
| 2013/0120870 A1 | 5/2013 | Zhou et al. |
| 2013/0148240 A1 | 6/2013 | Ferris et al. |

\* cited by examiner

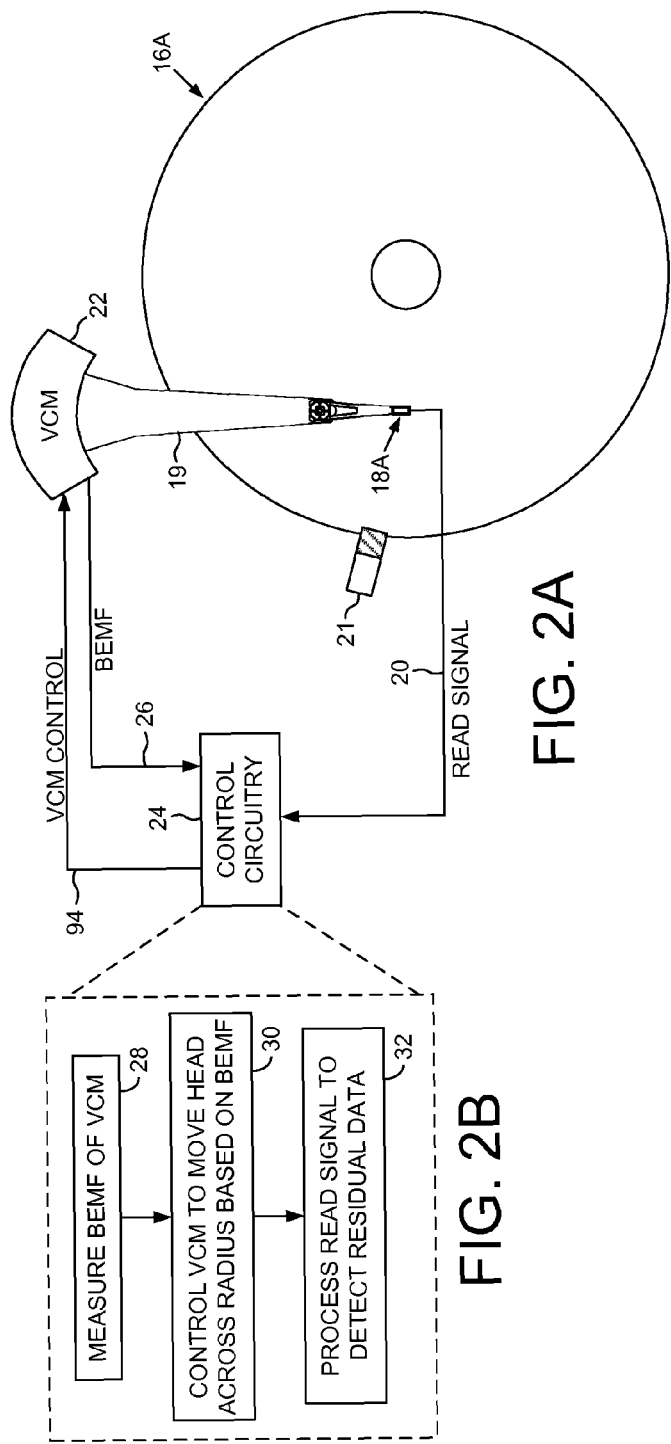
FIG. 2A
FIG. 2B
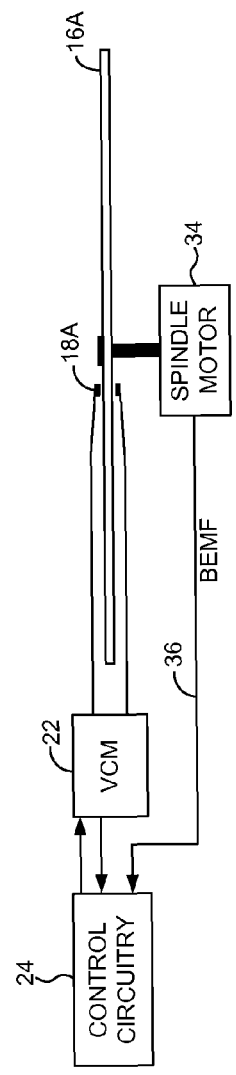
FIG. 2C

DISK DRIVE PERFORMING SPIRAL SCAN OF DISK SURFACE TO DETECT RESIDUAL DATA

CROSS-REFERENCE TO RELATED APPLICATIONS

This application claims priority to provisional U.S. Patent Application Ser. No. 61/822,232, filed on May 10, 2013, which is hereby incorporated by reference in its entirety.

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector 6, further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations.

BRIEF DESCRIPTION OF THE DRAWINGS

FIG. 2A shows a disk drive according to an embodiment comprising a head actuated over a disk and control circuitry.

FIG. 2B is a flow diagram according to an embodiment wherein the control circuitry controls a VCM to move the head over substantially the entire radius of the disk surface in response to a BEMF voltage while processing a read signal from the head to detect residual data recorded on the disk surface after erasing the disk surface.

FIG. 2C shows a disk drive according to an embodiment comprising a spindle motor operable to rotate the disk and generate a BEMF voltage used to synchronize a disk locked clock.

DETAILED DESCRIPTION

Figure 1:
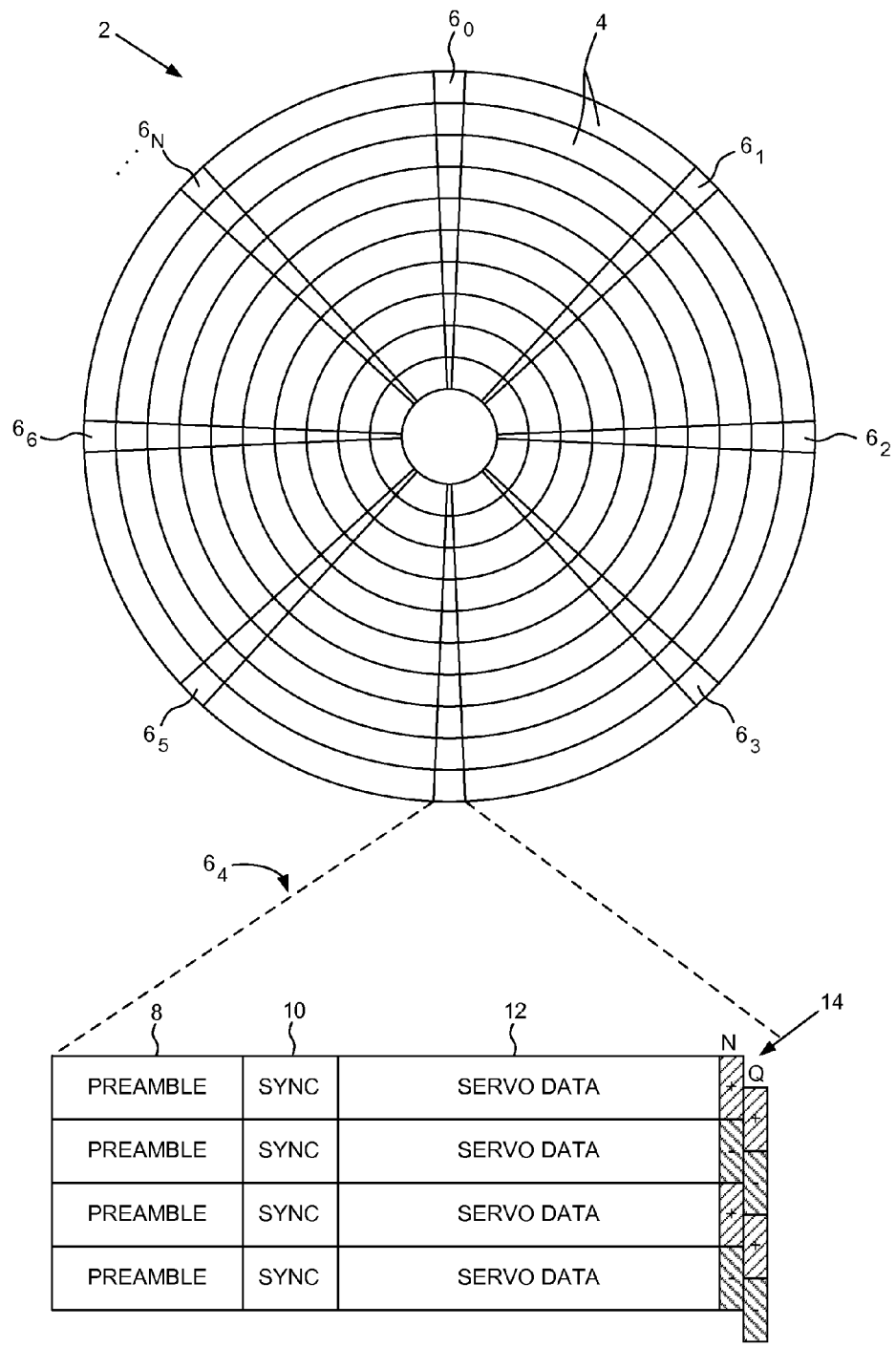
FIG. 1 shows a prior art disk format comprising a plurality of servo tracks defined by servo sectors.

FIG. 2A shows a disk drive according to an embodiment comprising a disk surface 16A comprising a radius, a head 18A operable to generate a read signal 20, and a voice coil motor (VCM) 22 operable to actuate the head 18A over the disk surface 16A. The disk drive further comprises control circuitry 24 operable to execute the flow diagram of FIG. 2B, wherein a back electromotive force (BEMF) voltage 26 generated by the VCM is measured (block 28). The VCM is controlled to move the head over substantially the entire radius of the disk surface in response to the BEMF voltage (block 30), and while moving the head the read signal from the head is processed to detect residual data recorded on the disk surface after erasing the disk surface (block 32).

In the embodiment of FIG. 2A, the disk surface 16A may be erased prior to writing servo data (e.g., servo sectors) on the disk surface 16A. Before performing the servo write operation, in one embodiment the control circuitry 24 scans the disk surface 16A to verify that the disk surface 16A has been sufficiently erased. If the control circuitry 24 detects residual data recorded on the disk surface 16A after erasing the disk surface 16A, the disk may be discarded or reprocessed in order to erase the residual data. In one embodiment, the residual data may be erased using an external device (e.g., a magnet), or the head 18A internal to the disk drive may be used to erase the residual data.

In one embodiment, a servo write operation for servo writing the disk surface 16A may be interrupted, for example, if a servo error tolerance is exceed. Alternatively, after the servo writing operation the disk surface 16A may fail a verification procedure which verifies whether the written product servo tracks satisfy certain limits, such as a track squeeze limit. When the servo write operation is interrupted, or the disk surface 16A fails the verification procedure, it may be desirable to erase the disk surface 16A prior to retrying the servo write operation. However, the erase operation may not completely erase the disk surface 16A, thereby leaving residual data on the disk surface 16A which may include part of a seed servo track (e.g., a spiral servo track) and/or part of a product servo track (e.g., a concentric servo sector). Accordingly, in one embodiment the control circuitry 24 scans the disk surface 16A to determine whether there is any residual data prior to retrying the servo write operation.

FIG. 2C shows an embodiment wherein a spindle motor 34 rotates the disk surface 16A while the control circuitry 24 moves the head 18A radially over the disk surface 16A to scan for residual data. Accordingly, in this embodiment the head 18A will traverse the disk surface 16A in a spiral trajectory having a slope that depends on the rotation speed of the disk surface 16A and the radial velocity of the head 18A. In one embodiment, the control circuitry 24 synchronizes a disk locked clock (DLC) to the rotation frequency of the disk 16A, and uses the DLC to sample the read signal 20 during the scan operation and detect the residual data by processing the signal samples. In one embodiment, the DLC may be synchronized to the rotation frequency of the disk surface 16A by synchronizing the DLC to a frequency of zero crossings in a BEMF voltage 36 generated by the spindle motor 34. In one embodiment, the control circuitry 24 processes the DLC in order to determine the circumferential location of the head 18A relative to the disk surface 16A, as well as calibrate the radial velocity of the head 18A for the scan operation.

Figure 3:
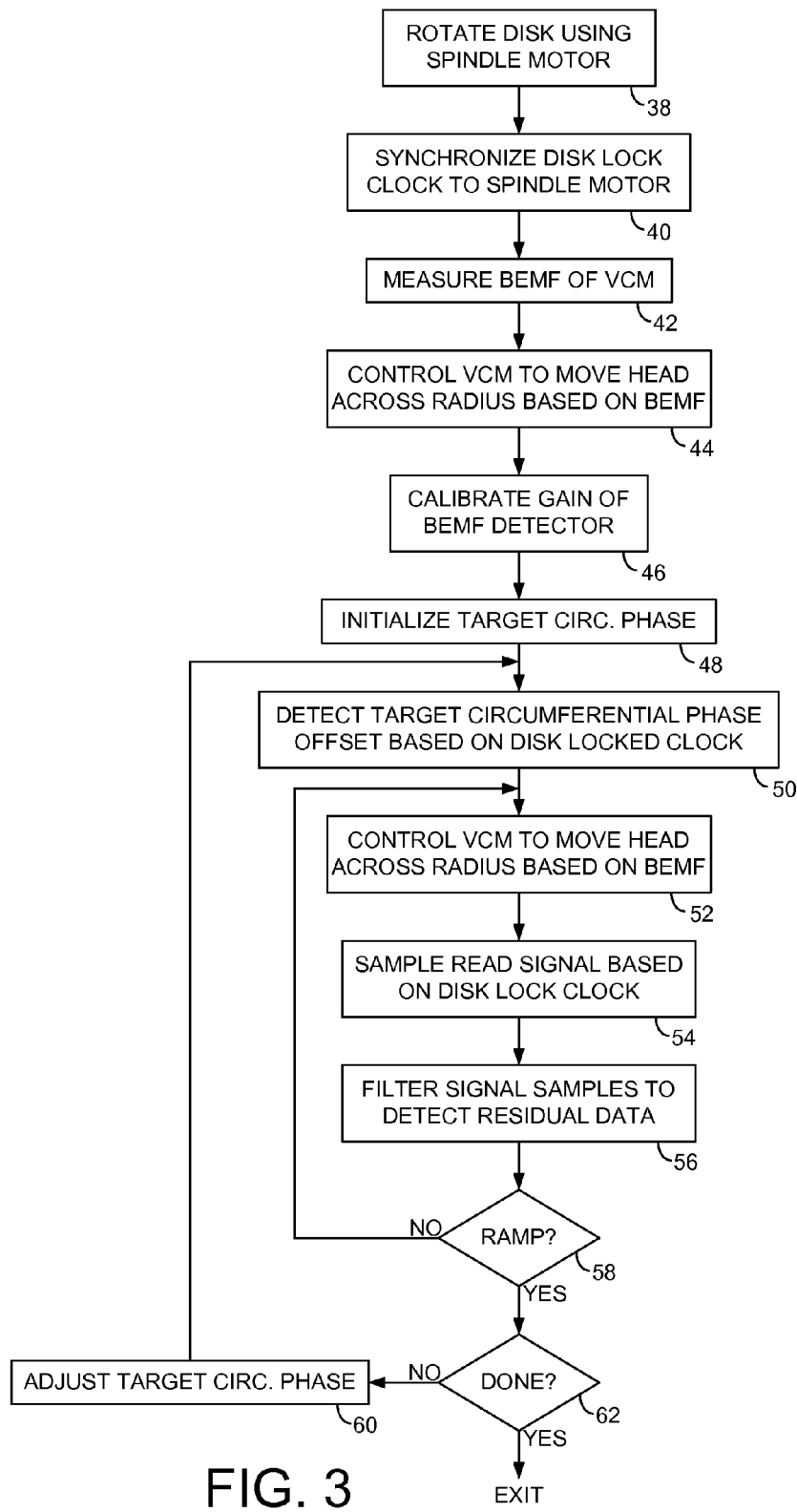
FIG. 3 is a flow diagram according to an embodiment wherein the head is scanned across the disk surface multiple times and the read signal samples filtered to detect residual data recorded on the disk surface.

This embodiment is understood with reference to the flow diagram of FIG. 3 wherein the disk surface 16A is rotated by the spindle motor (block 38) and the DLC is synchronized to a rotation frequency of the spindle motor (block 40). The BEMF of the VCM is measured (block 42), and the VCM is controlled to move the head across the radius of the disk surface 16A based on the BEMF (block 44). In one embodiment, the head 18A may first be positioned near an inner diameter (ID) of the disk, for example, by controlling the VCM 22 until the actuator arm 19 (FIG. 2A) engages an ID crash stop. The VCM 22 may then be controlled to move the head 18A toward the outer diameter (OD) of the disk surface 16A until the head 18A engages a ramp 21 located near an OD of the disk. While moving the head 18A toward the OD, the number of DLC cycles is counted, and when the head 18A engages the ramp 21, the total number of DLC cycles is compared to a target number of cycles, where the difference (error) may be used to calibrate a gain of a BEMF detector (block 46). In one embodiment, blocks 42-46 of FIG. 3 may be repeated until the gain error falls below a threshold.

After calibrating the gain of the BEMF detector, a target circumferential phase for the head is initialized (block 48). The DLC is then evaluated to determine when the head reaches the target circumferential phase as the disk surface rotates (block 50). When the head reaches the target circumferential phase, the VCM is controlled to begin moving the head toward the OD of the disk surface (block 52) while sampling the read signal to generate signal samples based on the frequency of the DLC (block 54). The signal samples are filtered based on a frequency corresponding to an expected frequency of the residual data, and the filtered signal samples processed to detect the residual data (block 56). The residual data may be detected in any suitable manner, such as by comparing an average amplitude of the filtered signal samples to a threshold. In one embodiment, when residual data is detected, the radial and circumferential location of the residual data is logged. The logged location information may be used to evaluate and modify the erase operation, or in another embodiment, the logged location information may be used by the control circuitry 24 to erase the detected residual data.

The head is moved radially over the disk and the signal samples processed to detect the residual data at substantially any point during the moving. When the head engages the ramp (block 58), the VCM is controlled to stop moving the head, and then return the head to the ID of the disk surface. The target circumferential phase for the head is then adjusted (block 60) such as by incrementing the target circumferential phase. The flow diagram of FIG. 3 is then repeated starting from block 50 in order to perform multiple scans across the radius of the disk surface at different phase offsets, thereby covering a significant portion of the disk surface (block 62).

Figure 4A:
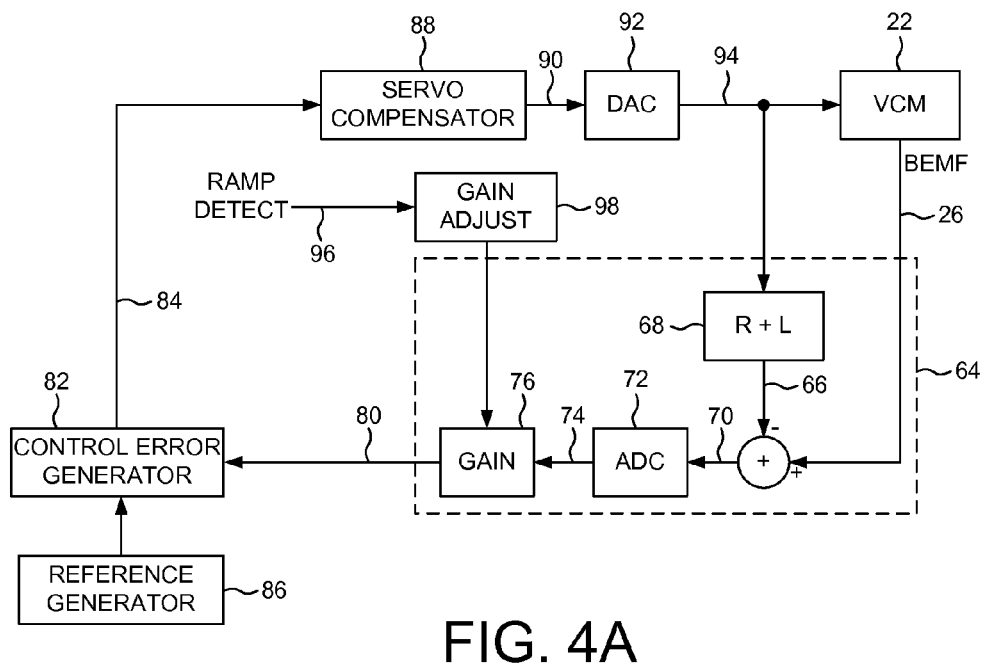
FIG. 4A shows control circuitry according to an embodiment for controlling the VCM based on its BEMF while scanning the disk surface for residual data.
Figure 4B:
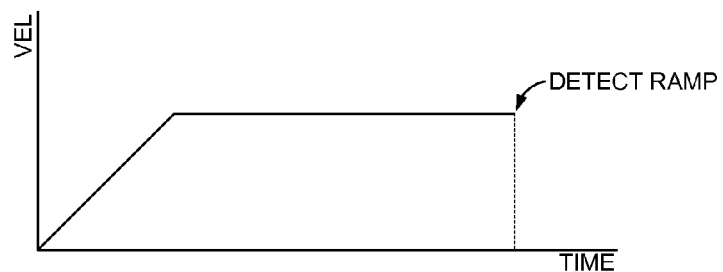
FIG. 4B shows a velocity profile for controlling the velocity of the head according to an embodiment.

FIG. 4A shows control circuitry according to an embodiment for controlling the VCM 22 based on the BEMF 26 while scanning the disk surface for residual data. A BEMF detector 64 subtracts from the BEMF 26 a voltage component 66 representing the contribution due to the resistant R and inductance L 68 of the VCM 22 to generate a voltage component 70 that more accurately reflects the contribution due to the velocity of the VCM 22. The resistance R and the inductance L 68 of the VCM 22 may be calibrated using any suitable technique, such as by injecting a small step input signal into the VCM 22 after pressing the actuator arm 19 against the ID crash stop, and measuring the resulting RL voltage drop across the VCM 22. The voltage component 70 due to the velocity of the VCM 22 is sampled 72, and the resulting sample values 74 are scaled by a gain 76. The scaled sample values 80 representing the velocity of the VCM are processed by a control error generator 82 which may, for example, compute a velocity error 84 as a difference between the measured velocity of the head and a target velocity generated by a reference generator 86 based on a velocity profile, an example of which is shown in FIG. 4B. A servo compensator 88 processes the velocity error 84 to generate a digital control signal 90. A digital to analog converter (DAC) 92 converts the digital control signal 90 into an analog control signal 94 applied to the VCM 22 so that the measured velocity 80 substantially follows the target velocity 86.

In the embodiment of FIG. 4A, a gain adjust block 98 adjusts the gain 76 of the BEMF detector 64 based on a measured number of DLC cycles before the head 18A engages the ramp 21. The measured number of DLC cycles is compared to a target number of DLC cycles, and the gain 76 is adjusted based on the difference. For example, if the measured number of DLC cycles is greater than the target number meaning that the scan velocity was too slow, the gain 76 may be decreased so as to increase the radial velocity of the head during the next move across the disk surface 16A. In one embodiment, the gain 76 of the BEMF detector 64 may be calibrated prior to starting the scan operation to detect the residual data, and in another embodiment the gain 76 may be adjusted during the scan operation each time the head is moved across the radius of the disk surface 16A.

In one embodiment, the gain of the read signal 20 emanating from the head 18A during the scan operation may be calibrated prior to executing the scan operation. For example, in one embodiment the head 18A may be positioned at the ID of the disk surface, such as by pressing the actuator arm 19 against the ID crash stop. In this embodiment, it is assumed that no data is recorded at the ID, and therefore the amplitude of the read signal will represent the signal noise. Accordingly, the gain of the read signal may be adjusted until the amplitude of the read signal reaches a target amplitude. During each seek across the radius of the disk surface, the residual data may be detected by comparing the average amplitude of the read signal to a detection threshold representing a margin above the noise floor of the read signal. In one embodiment, the detection threshold may be configured so as to maximize a probability of detecting true residual data while minimizing the probability of false detections.

Figure 5A:
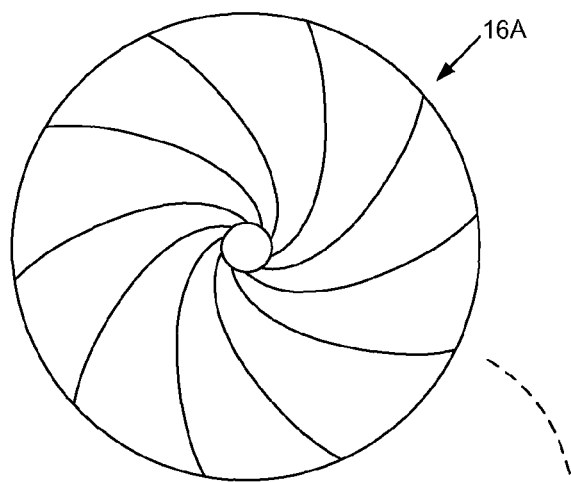
FIGS. 5A-5C illustrate an embodiment wherein the residual data detected after erasing the disk surface may comprise part of a spiral servo track and/or part of a concentric servo sector.
Figure 5B:
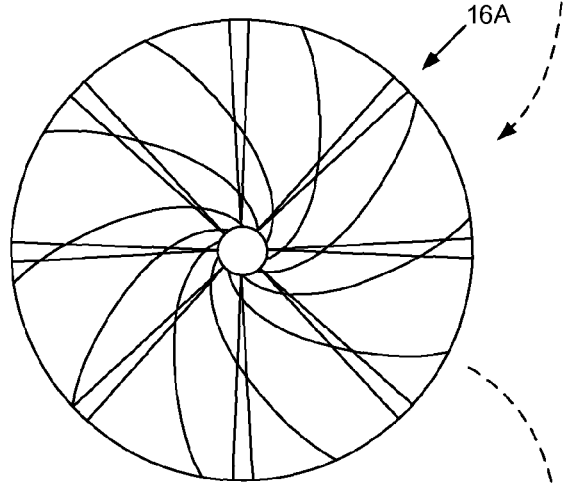

FIG. 5A shows an embodiment wherein as part of a servo write operation, a plurality of spiral servo tracks may be written to the disk surface 16A. The spiral servo tracks may be written using an external servo writer, or the spiral servo tracks may be written internally by the control circuitry 24. In one embodiment, a plurality of bootstrap spiral tracks may be written to the disk surface 16A to facilitate the internal writing of the spiral servo tracks. FIG. 5B shows an embodiment wherein the control circuitry 24 may process the spiral servo tracks in order to write a plurality of concentric servo sectors that define product servo tracks on the disk surface 16A.

In one embodiment, the quality of the servo write operation may be monitored to verify that the product servo tracks are written with sufficient accuracy. For example, the consistency of the spiral servo tracks may be monitored during and/or after writing the spiral servo tracks. If the spiral servo tracks deviate from predetermined limits, the servo write operation may be aborted and retried. Similarly, the servo write operation may be aborted during and/or after writing the concentric servo sectors that define the product servo tracks. After the servo write operation is aborted, in one embodiment it is desirable to completely erase the disk surface so that the servo write operation can be restarted with a clean disk surface. If the disk surface is not erased completely, any residual data may interfere with the subsequent servo write operation.

Figure 5C:
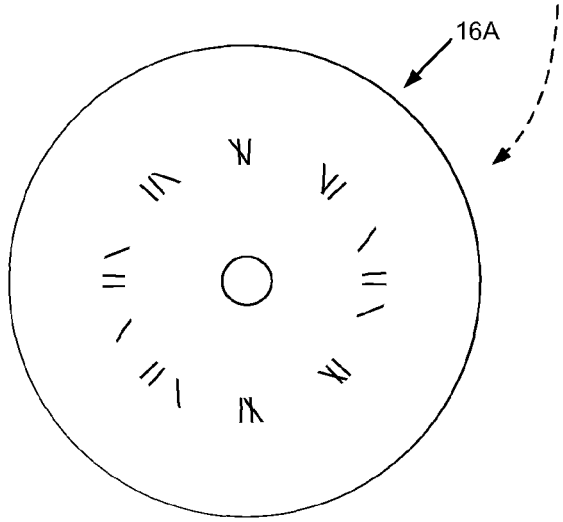

FIG. 5C illustrates an example of residual data after erasing the disk surface, wherein in this example a concentric band of residual data remains on the disk surface after the erase operation. Also in this example, the erase operation was performed after writing spiral servo tracks to the disk surface, and after at least partially writing the concentric servo sectors to the disk surface, such that the residual data comprises part of a spiral servo track as well as part of a concentric servo sector.

In one embodiment, each spiral servo track may be written to the disk surface as a high frequency signal periodically interrupted by a sync mark. In addition, each spiral servo track may be written at a frequency that differs from a frequency of data written in the concentric servo sectors. In yet another embodiment, the concentric servo sectors may be written at a varying frequency based on the radial location of the head (zoned servo sectors). For example, the data rate of the concentric servo sectors may be increased toward the OD so as to achieve a more constant linear bit density. In one embodiment, the frequency of the data written in the spiral servo tracks and the concentric servo sectors may be based on a frequency of a DLC. Accordingly, during the scan operation the read signal may be sampled using the DLC synchronized to the frequency of the spindle motor so that the resulting signal samples may be filtered based on a frequency corresponding to an expected frequency of the residual data. In the embodiment where the frequency of the residual data may differ based on the type of data, the signal samples may be filtered at multiple frequencies in order to distinguish between the different types of residual data. In one embodiment, the type of residual data, together with the location of the detected residual data, may be logged and used to evaluate and modify the erase operation.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A disk drive comprising:
   a disk surface comprising a radius;
   a head operable to generate a read signal;
   a voice coil motor (VCM) operable to actuate the head over the disk surface; and
   control circuitry operable to:
      measure a back electromotive force (BEMF) voltage generated by the VCM;
      control the VCM to move the head over substantially the entire radius of the disk surface in response to the BEMF voltage; and
      while moving the head, process the read signal from the head to detect residual data recorded on the disk surface after erasing the disk surface.

2. The disk drive as recited in claim 1, wherein the control circuitry is further operable to process the read signal to detect the residual data recorded on the disk surface at substantially any point during the moving.

3. The disk drive as recited in claim 1, wherein the control circuitry is further operable to move the head over substantially the entire radius of the disk surface a number of times, wherein each time the control circuitry is operable to start the moving from a different circumferential phase offset.

4. The disk drive as recited in claim 1, wherein the control circuitry is further operable to move the head from a first location near an inner diameter of the disk surface until the head contacts a ramp near an outer diameter of the disk surface.

5. The disk drive as recited in claim 1, wherein the control circuitry is further operable to calibrate a gain of a BEMF detector operable to measure the BEMF voltage of the VCM.

6. The disk drive as recited in claim 1, further comprising a spindle motor operable to rotate the disk surface, wherein the control circuitry is further operable to:
   synchronize a disk locked clock (DLC) to a rotation frequency of the disk surface; and
   sample the read signal in response to the DLC to generate signal samples.

7. The disk drive as recited in claim 6, wherein the control circuitry is further operable to filter the signal samples based on a frequency corresponding to an expected frequency of the residual data.

8. The disk drive as recited in claim 7, wherein the control circuitry is further operable to filter the signal samples based on a number of target frequencies, wherein each target frequency corresponds to a corresponding type of residual data.

9. The disk drive as recited in claim 8, wherein the type of residual data comprises a residual spiral servo track.

10. The disk drive as recited in claim 8, wherein the type of residual data comprises a residual concentric servo track.

11. The disk drive as recited in claim 1, wherein the control circuitry is further operable to log a location of the detected residual data.

12. A method of operating a disk drive comprising a disk surface comprising a radius, a head operable to generate a read signal, and a voice coil motor (VCM) operable to actuate the head over the disk surface, the method comprising:
   measuring a back electromotive force (BEMF) voltage generated by the VCM;
   controlling the VCM to move the head over substantially the entire radius of the disk surface in response to the BEMF voltage; and
   while moving the head, processing the read signal from the head to detect residual data recorded on the disk surface after erasing the disk surface.

13. The method as recited in claim 12, further comprising processing the read signal to detect the residual data recorded on the disk surface at substantially any point during the moving.

14. The method as recited in claim 12, further comprising moving the head over substantially the entire radius of the disk surface a number of times, wherein each time starting the moving from a different circumferential phase offset.

15. The method as recited in claim 12, further comprising moving the head from a first location near an inner diameter of the disk surface until the head contacts a ramp near an outer diameter of the disk surface.

16. The method as recited in claim 12, further comprising calibrating a gain of a BEMF detector operable to measure the BEMF voltage of the VCM.

17. The method as recited in claim 12, further comprising a spindle motor operable to rotate the disk surface, the method further comprising:
   synchronizing a disk locked clock (DLC) to a rotation frequency of the disk surface; and
   sampling the read signal in response to the DLC to generate signal samples.

18. The method as recited in claim 17, further comprising filtering the signal samples based on a frequency corresponding to an expected frequency of the residual data.

19. The method as recited in claim 18, further comprising filtering the signal samples based on a number of target frequencies, wherein each target frequency corresponds to a corresponding type of residual data.

20. The method as recited in claim 19, wherein the type of residual data comprises a residual spiral servo track.

21. The method as recited in claim 19, wherein the type of residual data comprises a residual concentric servo track.

22. The method as recited in claim 12, further comprising logging a location of the detected residual data.

* * * * *